United States Patent [19]
Peterson et al.

[11] Patent Number: 5,057,290
[45] Date of Patent: Oct. 15, 1991

[54] PROCESS AND APPARATUS FOR THE LOW TEMPERATURE RECOVERY OF FERROUS CHLORIDE FROM SPENT HYDROCHLORIC ACID PICKLE LIQUORS

[76] Inventors: Joseph C. Peterson, 3684 Waldon Pl., Carmel, Ind. 46032; George A. Salof, 7708 Oakview La., Lenexa, Kans. 66216

[21] Appl. No.: 512,935

[22] Filed: Apr. 23, 1990

[51] Int. Cl.$^5$ .......................... B01D 9/02; C01B 7/07; C01G 49/10
[52] U.S. Cl. .................................. 423/140; 423/488; 423/493; 62/544
[58] Field of Search ............... 423/140, 142, 493, 488; 62/532, 541, 544

[56] References Cited

U.S. PATENT DOCUMENTS 3,540,513  11/1970  Sumiya et al. ..................... 423/140
3,900,955   8/1975  Peterson ............................ 62/544

FOREIGN PATENT DOCUMENTS 61-163122  7/1986  Japan ................................. 423/140

Primary Examiner—Michael L. Lewis
Assistant Examiner—Brian M. Bolam
Attorney, Agent, or Firm—Woodard, Emhardt, Naughton, Moriarty & McNett

[57] ABSTRACT

Processes and apparatus for the closed-loop regeneration of spent hydrochloric acid pickle liquors that have been used to pickle ferrous metals by recovering ferrous chloride from the spent pickle liquors at very low temperatures. The process includes maintaining the hydrochloric acid and iron concentrations within the spent pickle liquor at levels that will prevent the liquor from freezing when cooled to about $-10$ degrees Fahrenheit and that will permit the formation of ferrous chloride crystals within the spent pickle liquor when the liquor is cooled below about $+18$ to 20 degrees Fahrenheit and to about $-10$ degrees Fahrenheit. The ferrous chloride crystals formed at such low temperatures are then removed from the pickle liquor, which then permits reuse of the free hydrochloric acid remaining within the thus regenerated pickle liquor in normal pickling operations.

9 Claims, 2 Drawing Sheets

PROCESS AND APPARATUS FOR THE LOW TEMPERATURE RECOVERY OF FERROUS CHLORIDE FROM SPENT HYDROCHLORIC ACID PICKLE LIQUORS

BACKGROUND OF THE INVENTION

The invention relates to the field of regenerating spent pickle liquors, and more particularly to the regeneration of spent hydrochloric acid pickle liquors that have been used for ferrous metal pickling by recovering ferrous chloride from the spent pickle liquors at very low temperatures.

Pickling of ferrous metals, such as steel strip, sheet, tubes or wire, to remove metal oxides and scale has typically been performed with a commercial hydrochloric acid pickle liquor that has been heated to about +200 degrees Fahrenheit by closed circuit steam-acid heat exchangers. A ferrous chloride solution is a principal by product of the pickling process.

High temperature systems for the closed-loop regeneration of spent hydrochloric acid pickle liquors that have been used to pickle ferrous metals are known. A roasting process has been conventionally employed in which the ferrous chloride within the spent pickle liquor is hydrolyzed in a reaction that takes place at approximately +840 degrees Fahrenheit to produce iron oxide and hydrogen chloride gas. The hydrogen chloride gas is then absorbed into water to form a suitable concentration of aqueous hydrochloric acid that can be returned to the pickling line as a regenerated pickling liquor. The high temperatures involved in such roasting processes are disadvantageous for a number of reasons, including the relatively high maintenance and operating costs attendant high temperatures, and the fact that at such high temperatures organic acid inhibitors typically utilized in acid pickle liquors are largely destroyed. Another known alternative has been a distillation process, but the same disadvantages of high distillation temperatures, the attendant high maintenance and operating costs, and the destruction of organic acid inhibitors, are present.

SUMMARY OF THE INVENTION

The present invention comprises novel processes and apparatus for the closed-loop regeneration of spent hydrochloric acid pickle liquors that have been used to pickle ferrous metals by recovering ferrous chloride from the spent pickle liquors at very low temperatures. The process includes maintaining the hydrochloric acid and iron concentrations within the spent pickle liquor at levels that will prevent the liquor from freezing when cooled to about −10 degrees Fahrenheit and will permit the formation of ferrous chloride crystals within the spent pickle liquor when the liquor is cooled below about +18 to 20 degrees Fahrenheit and to about −10 degrees Fahrenheit. The ferrous chloride crystals formed at such low temperatures are then removed from the pickle liquor, which then permits reuse of the free hydrochloric acid remaining within the regenerated pickle liquor in normal pickling operations. The low temperature, low energy requirements of the processes of the invention make them economically superior to any known high temperature closed-loop regeneration process for spent hydrochloric acid pickle liquors, and allows the recycling of a much larger percentage of any organic acid inhibitors that were present in spent pickle liquor.

One embodiment of the present invention is a process for recovering ferrous chloride from spent hydrochloric acid pickling liquors used to pickle ferrous metals comprising: providing a spent hydrochloric acid pickling liquor having sufficient amounts of free hydrochloric acid and iron to allow subsequent precipitation of ferrous chloride crystals at low temperatures without freezing the pickling liquor; cooling the liquor to a temperature sufficiently low to cause ferrous chloride crystals to form; and separating the precipitated ferrous chloride crystals from the resultant supernatant.

Another embodiment of the present invention is an apparatus for recovering ferrous chloride crystals from a spent hydrochloric acid pickling liquor used to pickle ferrous metals comprising: a first supply of spent pickle liquor, the first supply containing spent hydrochloric acid pickling liquor; a first container suitable for holding the spent pickling liquor; a valved conduit connecting the first container with the first supply for delivering spent pickling liquor from the first supply to the first container; refrigerating means including a refrigerating heat exchanger positioned in association with the first container for actively cooling spent pickling liquor within the first container to a temperature sufficiently low to cause ferrous chloride crystals to form; agitating means to cause the spent pickling liquor to flow within the first container while being actively cooled; and separating means for separating precipitated ferrous chloride crystals from the resultant supernatant.

An object of the present invention is to provide a process and apparatus for regenerating the free hydrochloric acid within a spent hydrochloric acid pickle liquor that has been used for pickling ferrous metals for reuse in the pickling line without the disadvantages characteristic of known high temperature processes.

Another object of the present invention is to provide a process and apparatus for recovering ferrous chloride from a spent hydrochloric acid pickle liquor wherein the ferrous chloride may be efficiently removed from the spent pickle liquor and easily handled after removal.

Another object of the present invention is to provide a process and apparatus for the efficient closed-loop regeneration of a spent hydrochloric acid pickle liquor for ferrous metals for reuse in a pickling line.

Related objects and advantages of the present invention will be apparent from the following descriptions.

DESCRIPTION OF THE PREFERRED EMBODIMENTS

Figure 1:
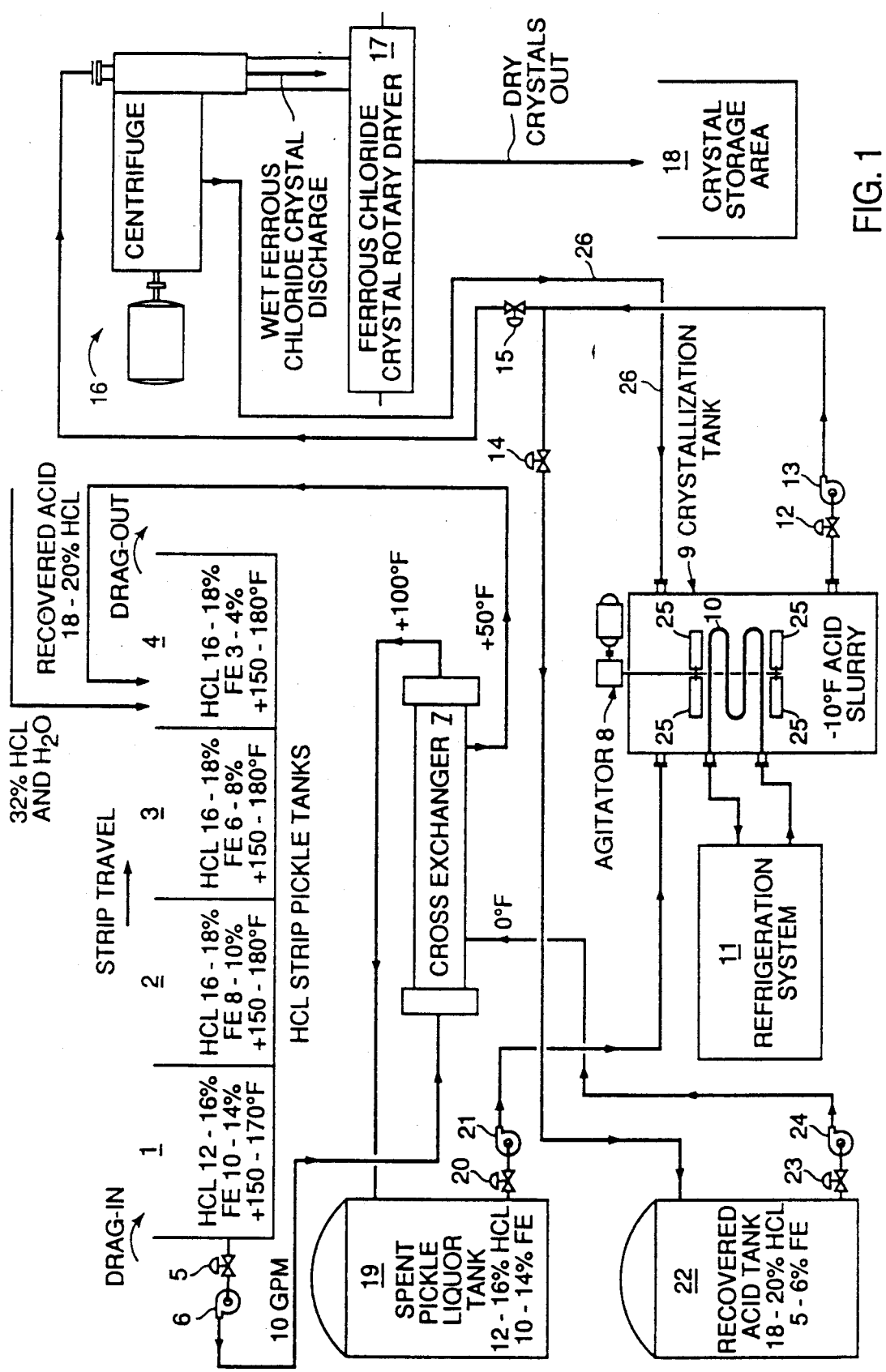
FIG. 1 illustrates a preferred apparatus for a batch-wise process to regenerate the spent hydrochloric acid pickle liquor from a steel strip pickling line according to the present invention by recovering ferrous chloride crystals from the spent pickle liquor at low temperatures and returning the regenerated pickle liquor to the pickling line.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now to FIG. 1, there is illustrated a preferred apparatus for a batch-wise process to regenerate the spent hydrochloric acid pickle liquor from a strip pickling line according to the present invention. A typical four tank 1 to 4 continuous steel strip pickling line utilizing commercial hydrochloric acid heated by conventional closed circuit steam-acid heat exchangers (not shown) is illustrated and labelled HCl Strip Pickle Tanks. The selection of a continuous steel strip pickling line is for illustrative purposes only, it being expressly understood that the processes and apparatus of the invention are not limited to use with continuous steel strip hydrochloric acid pickling lines, only.

Continuing to refer to FIG. 1, the approximate free hydrochloric acid ("HCl") and iron ("Fe") concentrations that are to be maintained in the pickle liquors within each tank of a conventional strip pickling line utilizing the batch-wise process and apparatus of the present invention are as indicated in tanks 1 to 4. The percentages are weight/volume. In known hydrochloric acid strip Pickling tanks that are heated by closed circuit steam-acid heat exchangers, the pickle liquor within pickle tank 1 when spent would typically have a free hydrochloric acid concentration of about 3 to 4% weight/volume, and an iron concentration of about 10 to 12% weight/volume, and would be maintained at a temperature of about +200 degrees Fahrenheit. The process of the present invention permits the free hydrochloric acid concentration of spent pickle/liquor within pickle tank 1 to be raised to about 12 to 16 weight/volume and the temperature of the spent pickle liquor in tank 1 to be lowered to an energy saving +150 to 170 degrees Fahrenheit.

The relatively high free hydrochloric acid concentrations and iron concentrations within the pickle liquors as indicated in the four pickle tanks 1 to 4 of FIG. 1 permit increased line speed and more effective throughput. More importantly to the present invention, however, when the free hydrochloric acid and iron concentrations within the spent pickle liquor of pickle tank 1 are maintained at the levels indicated (free hydrochloric acid concentration between about 12 and 16% weight/volume and iron concentration between about 10 and 14% weight/volume) the spent pickle liquor may be cooled to temperatures as low as −10 degrees Fahrenheit without freezing, and the ferrous chloride within the spent pickle liquor will crystallize as the spent pickle liquor is cooled through about 18 to 20 degrees Fahrenheit to about −10 degrees Fahrenheit, according to the processes of the invention.

Continuing to refer to FIG. 1, the batch-wise process of the present invention is initiated when spent pickle liquor within tank 1 is available for regeneration. Valve 5 is opened and the spent pickle liquor, at a temperature of about +150 to 170 degrees Fahrenheit and with the free hydrochloric acid and iron concentrations indicated in tank 1, is pumped under the influence of pump 6 through cross heat exchanger 7 and into temporary storage in spent pickle liquor tank 19. Cross heat exchanger 7 is preferably a shell and tube type and has sufficient square footage of high nickel steel (Incoloy 625 or its equal) to cool the +150 to 170 degrees Fahrenheit spent pickle liquor from tank 1 to about +100 degrees Fahrenheit when cross exchanged with regenerated pickle liquor at about 0 degrees Fahrenheit transferred from recovered acid tank 22 to pickle tank 4 on the pickling line, as will be discussed below. Spent pickle liquor tank 19 is preferably of either rubber-lined steel or fiberglass construction.

When the spent pickle liquor from tank 1 has been transferred to tank 19, valve 5 is closed and pump 6 is deactivated. The spent pickle liquor within tank 19 defines the batch for regeneration processing according to the preferred batch-wise embodiment of the invention.

Continuing to refer to FIG. 1, from tank 19, the batch of spent pickle liquor is pumped through opened valve 20 under the influence of pump 21 and into covered crystallization tank 9, which is preferably made of steel with a rubber lining. Within the crystallization tank 9, the batch of spent pickle liquor is cooled in a controlled crystallization process to approximately −10 degrees Fahrenheit by refrigeration system 11, which feeds a refrigerant directly into and through cooling coil 10, as the spent pickle liquor flows over cooling coil 10 under the influence of agitator 8 and its agitator blades 25.

Refrigeration system 11 is preferably a conventional R-22 vapor compressor type with a reciprocating or screw compressor, ammonia or halocarbon refrigerants, and water cooled, air cooled or evaporative-type condensers. Refrigeration system 11 has sufficient capacity to cool the batch of spent pickle liquor within crystallization tank 9 from about +100 degrees Fahrenheit to about −10 degrees Fahrenheit. Cooling coil 10 is preferably in the form of a serpentine U-tube manufactured from a high nickel steel, such as Incoloy 625 or its equal, that is suitable for direct contact with ammonia or halocarbon R-22 refrigerants (direct expansion or flooded). The cross section area of the U-tube of the cooling coil 10 is preferably sized to permit a sufficient velocity of spent pickle liquor across a coil surface of sufficient square footage to allow cooling of the spent pickle liquor within crystallization tank 9 from about +100 degrees Fahrenheit to about −10 degrees Fahrenheit.

Agitator 8 is also preferably manufactured from a high nickel steel. The agitator blades 25 and the revolutions per minute of agitator 8 are preferably chosen to create a sufficient flow of the spent pickle liquor across the cooling coil 10 within crystallization tank 9 to prevent ferrous chloride from crystallizing directly upon the cooling coil 10 as the spent pickle liquor is cooled through +18 to 20 degrees Fahrenheit and to about −10 degrees Fahrenheit. In work completed to date, in a crystallization tank 9 having a capacity of approximately 5,000 gallons, one upper 48 inch diameter four-blade axial flow turbine (25), and one lower 48 inch diameter four-blade axial flow turbine (25), each made of Incoloy 625 steel or its equal, and mounted to a 3 inch diameter shaft from agitator 8, which is operated at an output speed of 60 revolutions per minute, causing the spent pickle liquor to reach a velocity of approximately 80-100 feet/minute over a coil surface area of about 430 square feet has been preferred.

When the spent pickle liquor has been cooled to approximately +18 to 20 degrees Fahrenheit within crystallization tank 9, ferrous chloride crystals will begin to form. When the ferrous chloride crystals have become approximately 10% weight/volume of the chilled pickle liquor within crystallization tank 9, the spent pickle liquor/ferrous chloride crystal slurry forming within crystallization tank 9 is pumped under the influence of pump 13 through opened valve 12, past closed valve 14, through open valve 15, and to a crystal dewatering centrifuge 16, which has high nickel steel wetted parts, where the wet ferrous chloride crystals are separated from the supernatant pickle liquor. The supernatant pickle liquor is then returned to crystallization tank 9 through line 26 for further cooling within crystallization tank 9 and further crystallization of ferrous chloride.

The wet ferrous chloride crystals separated from the pickle liquor by centrifuge 16 are very unstable and must be immediately dried in a crystal rotary dryer 17, for example, for deposit into a dry crystal storage area 18, or, alternatively, the wet ferrous chloride crystals can be mixed with water to create aqueous ferrous chloride (not shown), which is also a stable end product.

Pumping of the pickle liquor/ferrous chloride crystal slurry from crystallization tank 9 to centrifuge 16 is continued until the temperature of the pickle liquor within crystallization tank 9 reaches about −10 degrees Fahrenheit, and until the ferrous chloride crystals formed at that temperature have been separated from the supernatant pickle liquor by centrifuge 16. Valve 15 is then closed and valve 14 is opened. The now regenerated pickle liquor is pumped under the influence of pump 13 from within crystallization tank 9 to a recovered acid tank 22, where the regenerated pickle liquor can be expected to have the recovered free hydrochloric acid and iron concentrations indicated within recovered acid tank 22 of FIG. 1.

The chilled regenerated pickle liquor within recovered acid tank 22, which will be at a temperature of about 0 degrees Fahrenheit, may then be transferred back to the pickling line by opening valve 23 and pumping the pickle liquor under the influence of pump 24, through cross heat exchanger 7, where the regenerated pickle liquor is warmed from about 0 degrees Fahrenheit to about +50 degrees Fahrenheit by cross exchange with the heated spent pickle liquor being transferred to the spent pickle liquor tank 19 from tank 1. From cross heat exchanger 7, the regenerated pickle liquor, with a recovered hydrochloric acid concentration of about 18 to 20% weight/volume, is piped to tank 4 where it is blended with any necessary amount of concentrated hydrochloric acid (32% weight/volume) and water to obtain the desired concentrations of free hydrochloric acid and iron within pickle tank 4, as indicated in FIG. 1.

Figure 2:
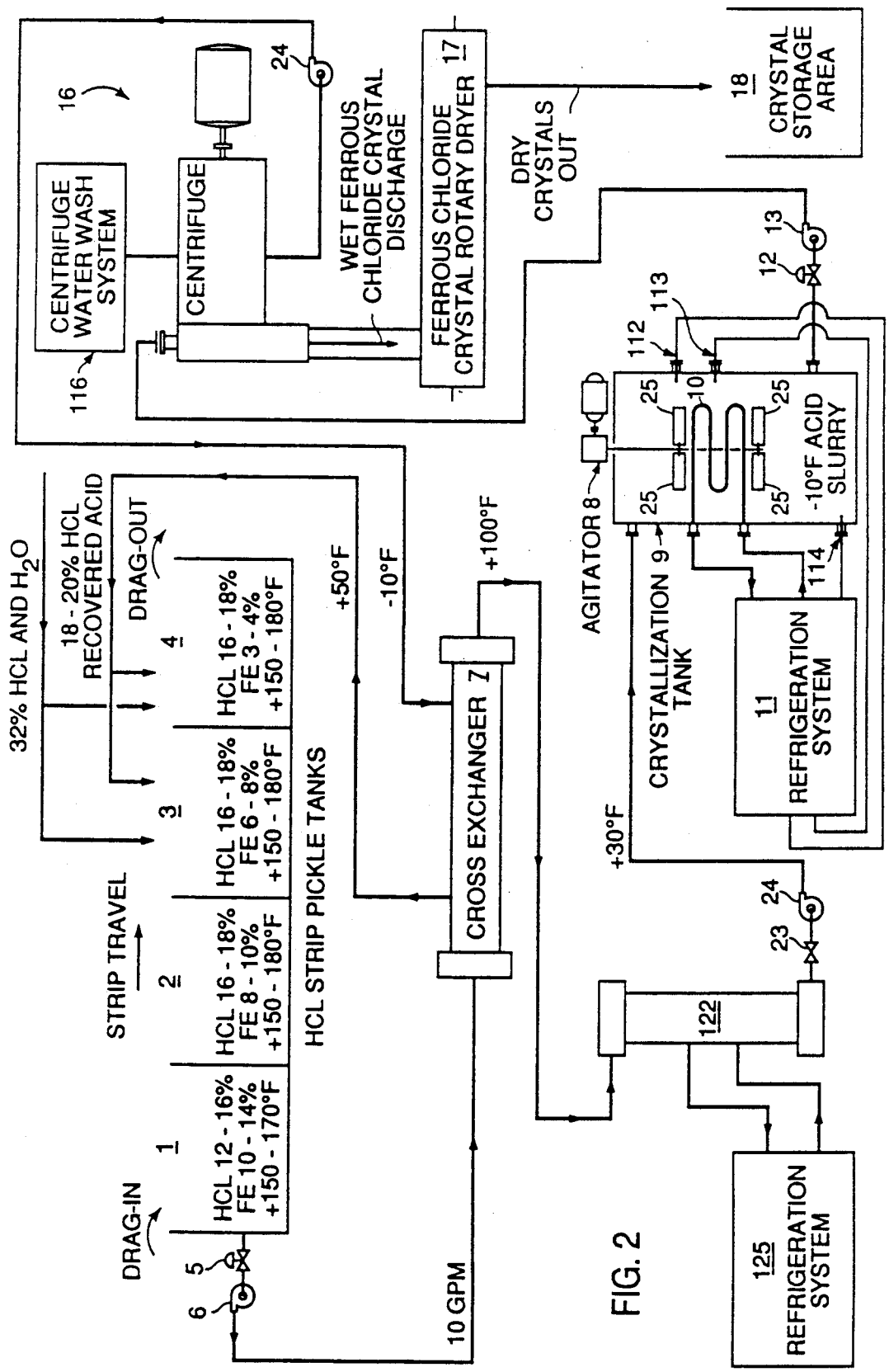
FIG. 2 illustrates a preferred apparatus for a continuous process to regenerate a spent hydrochloric acid pickle liquor from a steel strip pickle line according to the present invention by recovering ferrous chloride crystals from the spent pickle liquor at low temperatures and returning the regenerated pickle liquor to the pickling line.

Referring now to FIG. 2, the batch-wise apparatus of FIG. 1 has been modified as illustrated in FIG. 2 to provide a preferred apparatus for a continuous process to regenerate spent hydrochloric acid pickle liquor from a strip pickling line according to the present invention. In the continuous process apparatus of FIG. 2, the spent pickle liquor tank 19 (FIG. 1) and the recovered acid tank 22 (FIG. 1) of the batch-wise process apparatus illustrated in FIG. 1 are replaced by a heat exchanger 122 (FIG. 2) and a second refrigeration system 125 (FIG. 2).

As was the case with the batch-wise process illustrated in FIG. 1, spent pickle liquor first passes through cross heat exchanger 7. In a continuous process in which approximately 10 gallons per minute are processed, cross heat exchanger 7 will have an approximate coil surface of about 200 square feet and will reduce the temperature of the spent pickle liquor from pickle tank 1 from about +150 to 170 degrees Fahrenheit to about +100 degrees Fahrenheit when cross exchanged with −10 degree Fahrenheit regenerated pickle liquor supernatant coming directly from centrifuge 16, as discussed below.

Heat exchanger 122 is preferably either a U-tube serpentine type, a vertical shell and tube type (falling film evaporator), shell and tube type (flooded, direct expansion using ammonia or halocarbon refrigerants), or a plate type evaporator (flooded, direct expansion) having sufficient surface area, using ammonia or halogen refrigerants from refrigeration system 125, to cool the spent pickle liquor that exists cross exchanger 7 from about +100 degrees Fahrenheit to about +30 degrees Fahrenheit. The wetted surfaces of heat exchanger 122 are preferably made of high nickel steel such as Incoloy 625 steel or its equal. Refrigeration system 125 is preferably a conventional R-22 vapor compressor type with a reciprocating or screw compressor, ammonia or halocarbon refrigerants, and water cooled, air cooled or evaporative-type condensers, with sufficient capacity to cool the spent pickle liquor passing through heat exchanger 122 from about +100 degrees Fahrenheit to about +30 degrees Fahrenheit. The temperature of the spent pickle liquor passing through valve 23 under the influence of pump 24 on its way to crystallization tank 9 is preferably approximately +30 degrees Fahrenheit.

Conventional level sensors 114, 113, and 112 within crystallization tank 9 will indicate the introduction of spent pickle liquor into crystallization tank 9, and will also indicate when the proper volume of spent liquor has entered crystallization tank 9 to commence cooling. A PC control and level sensor 113 initiates the operation of refrigeration system 11 and agitator 8. In the continuous process, because the spent pickle liquor will enter crystallization tank 9 at a lower temperature (+30 degrees Fahrenheit) refrigeration system 11 need only have sufficient capacity to cool the spent pickle liquor within crystallization tank 9 from about +30 degrees Fahrenheit to about −10 degrees Fahrenheit. The agitator blades 25 and the revolutions per minute of agitator 8 are again preferably chosen to cause the flow of the spent pickle liquor across the cooling coil 10 within crystallization tank 9 to reach a sufficient velocity to prevent ferrous chloride crystals from forming directly upon the cooling coil 10 as the spent pickle liquor is being cooled to about −10 degrees Fahrenheit.

In work completed to date, for a continuous process designed to process 10 gallons of spent pickle liquor per minute, a crystallization tank 9 having a capacity of approximately 1,500 gallons is adequate. Agitator 8 is preferably equipped with one upper 2 inch four-blade axial flow turbine (25) and one lower 36 inch diameter four-blade axial flow turbine (25), each made of Incoloy 625 steel or its equal, and mounted to a 3 inch diameter shaft from agitator 8, which is operated at an output speed of 60 revolutions per minute to Provide a velocity of pickle liquor across cooling coil 10 of approximately 80–100 feet/minute.

Continuing to refer to FIG. 2, spent pickle liquor remains within crystallization tank 9 until it is cooled to approximately −10 degrees Fahrenheit. As in the batch-wise Process, ferrous chloride crystals will begin forming within crystallization tank 9 as the pickle liquor is cooled below about +18 to 20 degrees Fahrenheit. When the resulting pickle liquor/ferrous chloride crystal slurry has reached −10 degrees Fahrenheit, valve 12 is opened and pump 13 is activated. The slurry is pumped under the influence of pump 13 to crystal dewatering centrifuge 16 where the wet ferrous chloride crystals are separated from the supernatant pickle liquor and are either dried in crystal rotary dryer 17, for example, for deposit into crystal storage area 18, or, alternatively, the wet ferrous chloride crystals are mixed with water to create aqueous ferrous chloride (again not shown). A centrifuge water wash system 116 optionally provides the means to cleanse centrifuge 16, as needed, in the continuous process embodiment.

The supernatant regenerated pickle liquor from centrifuge 16, still at a temperature of about −10 degrees Fahrenheit, is pumped directly under the influence of pump 24 through cross heat exchanger 7 where the supernatant regenerated pickle liquor, with a recovered acid concentration of about 18 to 20% weight/volume, is heated from about −10 degrees Fahrenheit to approximately +50 degrees Fahrenheit by cross exchange with spent pickle liquor from tank 1, and is then added to either Pickle tanks 3 or 4 in the continuous process together with any necessary concentrated hydrochloric acid (32% weight/volume) and water to obtain the desired concentrations of free acid and iron indicated in pickle tanks 3 and 4 of FIG. 2. Alternatively, the regenerated pickle liquor may be transferred to a recovered acid tank not shown in FIG. 2 but similar to tank 22 of FIG. 1.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A process for recovering ferrous chloride from spent hydrochloric acid pickle liquors that have been used to pickle ferrous metals comprising:
   (a) providing a spent hydrochloric acid pickle liquor having sufficient amounts of free hydrochloric acid and iron to allow subsequent precipitation of ferrous chloride crystals from the pickle liquor at temperatures below about +20 degrees Fahrenheit and to about −10 degrees Fahrenheit without freezing the pickle liquor;
   (b) cooling the pickle liquor by refrigeration means to a temperature below about +20 degrees Fahrenheit to cause ferrous chloride crystals to form; and
   (c) separating the ferrous chloride crystals from the supernatant.

2. The process of claim 1 and additionally comprising recycling the supernatant, which contains free hydrochloric acid and any ferrous chloride left in solution, by pickling a ferrous metal within a pickle tank containing the supernatant.

3. The process of claim 1 in which said providing comprises providing a spent pickle liquor at a temperature of about +150 to 170 degrees Fahrenheit.

4. The process of claim 1 wherein said providing comprises providing a spent pickle liquor in which there is about 12 to 16 percent by weight free hydrochloric acid and about 10 to 14 percent by weight iron.

5. The process of claim 3 and additionally comprising pre-cooling the spent pickling liquor to below about +100 degrees Fahrenheit prior to said cooling.

6. The process of claim 5 wherein said pre-cooling is to a temperature of about +30 degrees Fahrenheit.

7. The process of claim 1 and additionally comprising agitating the pickle liquor during said cooling.

8. The process of claim 1 wherein said separating comprises separating the ferrous chloride crystals from the supernatant with a crystal dewatering centrifuge.

9. The process of claim 4 in which said cooling step is to a temperature of about −10 degrees Fahrenheit.

* * * * *

UNITED STATES PATENT AND TRADEMARK OFFICE
CERTIFICATE OF CORRECTION

PATENT NO. : 5,057,290

DATED : October 15, 1991

INVENTOR(S) : Joseph C. Peterson, et al.

It is certified that error appears in the above-identified patent and that said Letters Patent is hereby corrected as shown below:

Title page, Item [76]  . Inventors, line 1, please change "Waldon" to --Walden--.

In column 3, line 35, please change "Pickling" to --pickling--.

In column 3, line 44, please change "16" to --16%--.

In column 6, line 22, please change "exists" to --exits--.

In column 6, line 68, please change "Provide" to --provide--.

In column 7, line 6, please change "Process" to --process--.

In column 7, line 31, please change "Pickle" to --pickle--.

Signed and Sealed this

Ninth Day of March, 1993

*Attest:*

STEPHEN G. KUNIN

*Attesting Officer*     *Acting Commissioner of Patents and Trademarks*